United States Patent Office 2,714,316
Patented Aug. 2, 1955

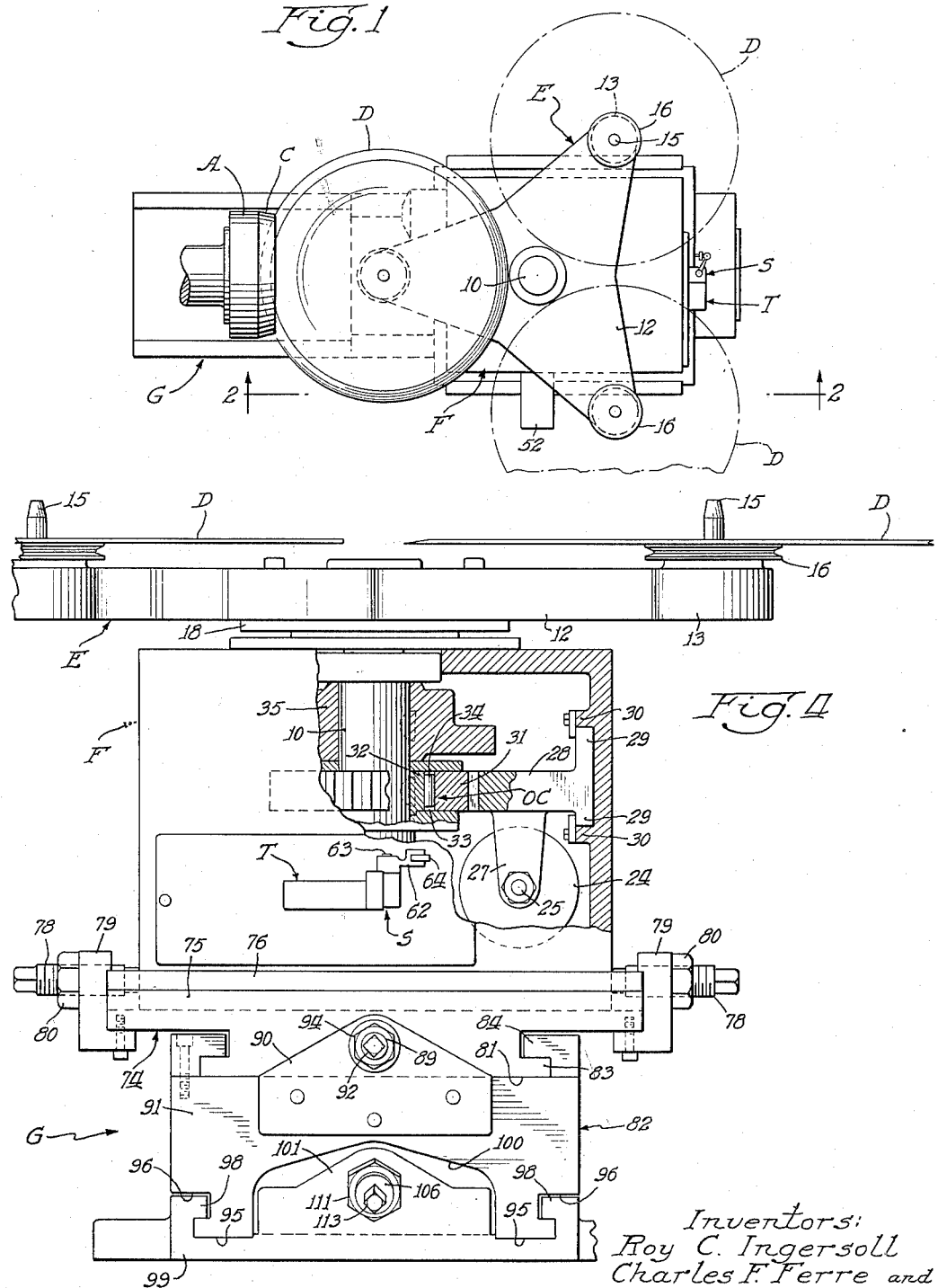

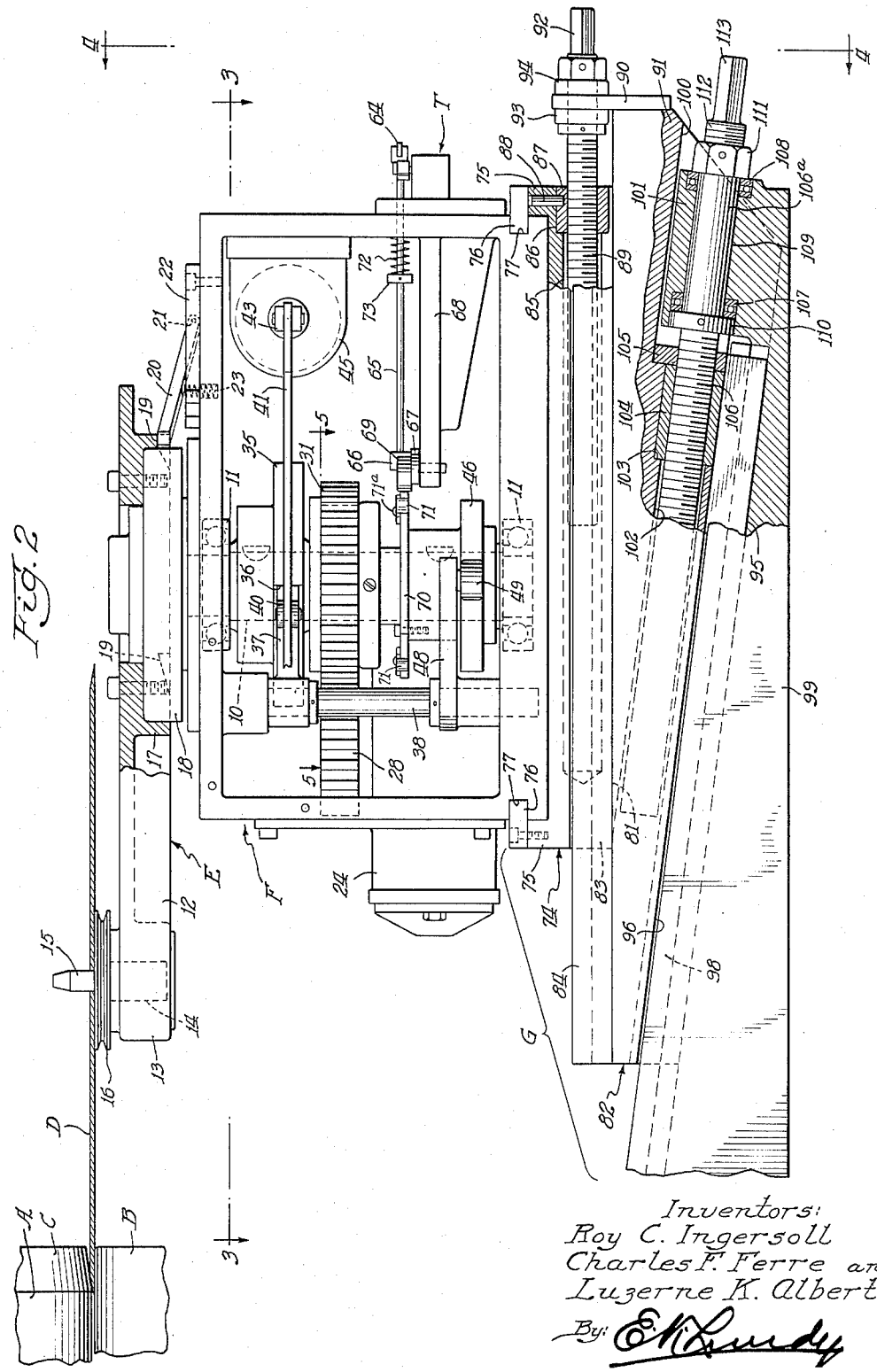

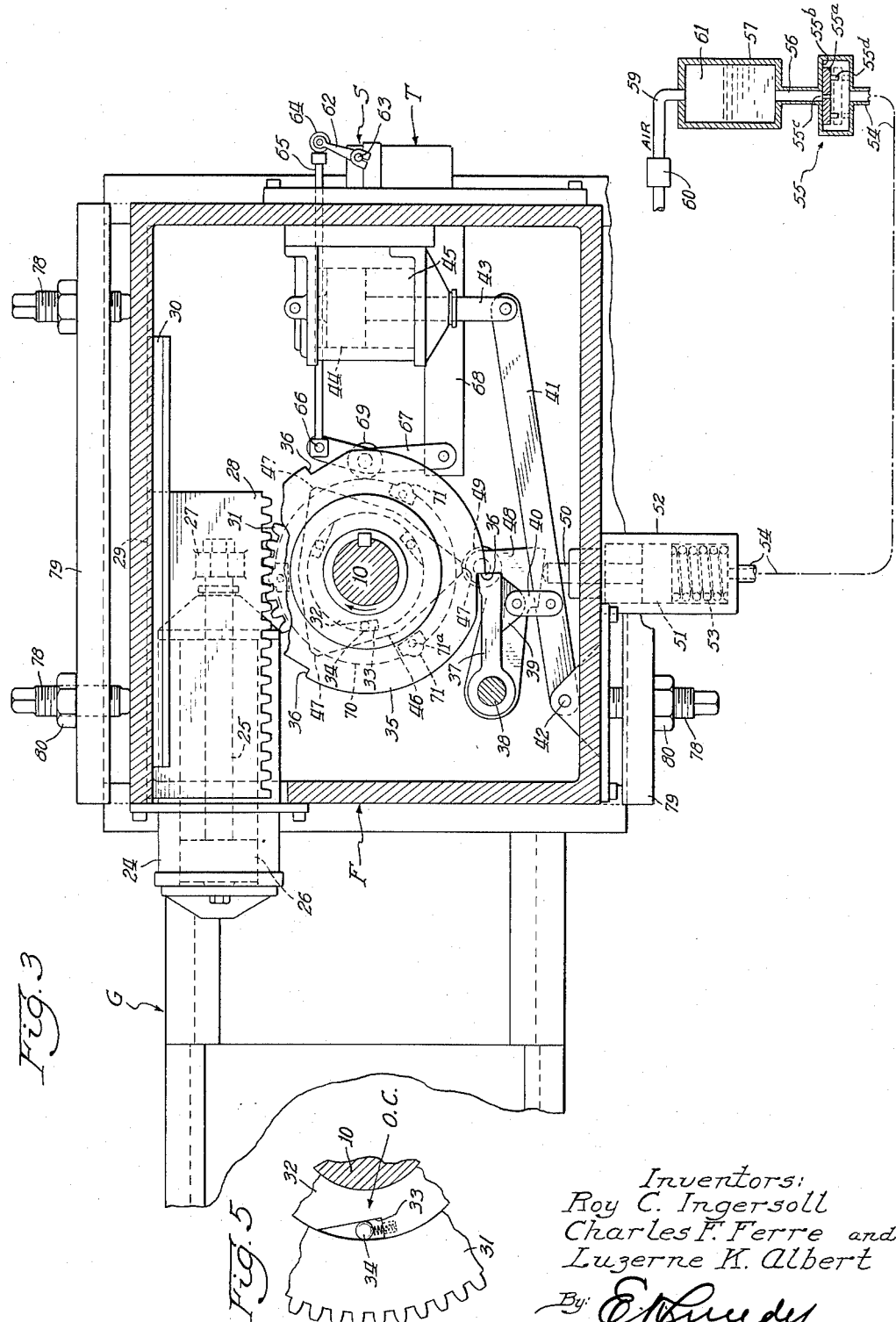

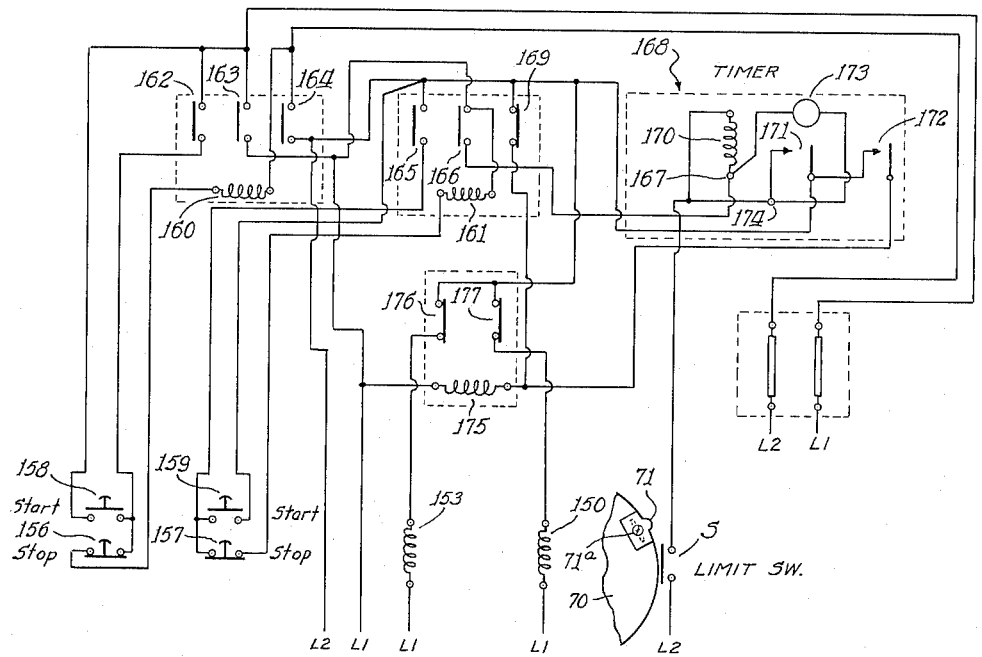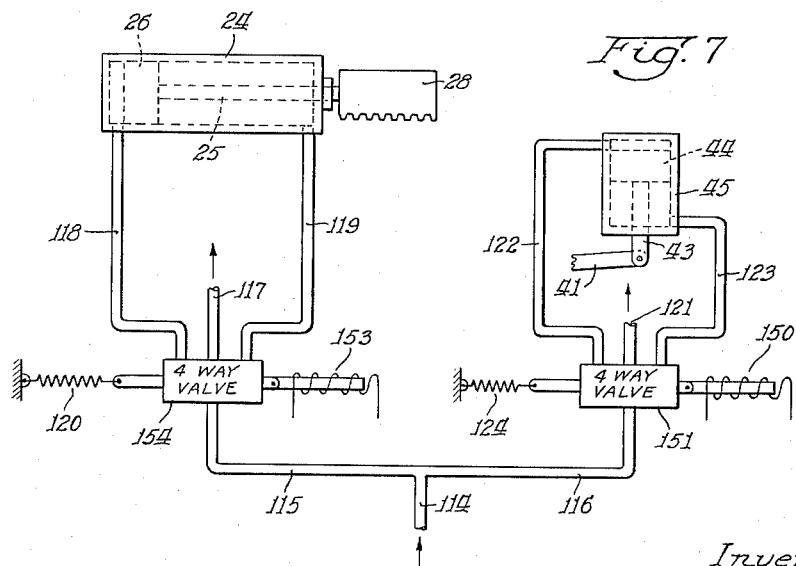

2,714,316

APPARATUS FOR MANUFACTURING EARTH-WORKING DISCS

Roy C. Ingersoll, Winnetka, Charles F. Ferre, Chicago, and Luzerne K. Albert, Harvey, Ill., assignors to Borg-Warner Corporation, Chicago, Ill., a corporation of Illinois Application September 22, 1951, Serial No. 247,872

9 Claims. (Cl. 76—89.2)

This invention relates to a work holding and indexing apparatus, the present improvements having more particular reference to a dial feed mechanism which is adapted to effect the movement of a work piece in an arcuate route from a loading station to a work performing station, and thence to an unloading station.

Although the present apparatus is adaptable for numerous types of work, it is, by way of example, shown and described herein in conjunction with a rolling mill for rolling or tapering the edges of agricultural discs. In the present disclosure, the disc in blank form, upon leaving a heating furnace, is placed on an adjacent portion of a rotatable work piece support or indexing table at the loading station whereupon the dial feed is actuated by suitable mechanism to arcuately rotate the table through an arc of a circle for transferring the disc to a work-performing station where the outer margin of the disc is rolled to a tapered cross section, and, upon completion of the rolling operation, the index table is again automatically moved arcuately to the unloading station where the disc is removed and may be placed in a forming press to be operated on by the press dies. These successive arcuate movements of the table are each accurately timed so that the indexing of the table is in proper sequence to provide a period of rest while the rolls operate on successive discs. It will be apparent that during the edging operation on a disc at the work performing station the advance disc is being removed at the unloading or final station, and another disc is being placed on the portion of the index table at the loading or first station.

An object of the present invention is to provide an apparatus of the character above described wherein means are provided for intermittently driving the work carrying member or indexing table and for accurately arresting movement of the table at the successive stations. The arcuate movements of the indexing table are somewhat rapid, and therefore, effective means have been provided to arrest this arcuate movement of the table precisely at each of the several stations. In this connection, the arresting means may take the form of a pawl and ratchet means which will definitely stop the movement of the table at each station. Due to the jar or impact resulting from this sudden stoppage of the movement of the table, locking means are provided for holding the table against retrograde or reverse movement which may result from the sudden impact, and snubber or buffer means are also provided to cushion the impact incident to the arresting of the table movement.

Another object of the present invention is to provide a work holding and indexing apparatus which comprises generally a base portion, having thereon a superstructure including the indexing table, which superstructure is adjustable in both the vertical and horizontal directions to properly position the indexing table with respect to the work performing means at the station between the loading and unloading stations.

Another object of the present invention resides in the provision of means for timing the periods of rest of the table while operations are being performed on the work piece, such timing being effected by means of an automatically operated limit switch which is responsive to rotative movement of the indexing table carrying the work piece from station to station.

Another object of the present invention is to provide motive means for intermittently rotating the indexing assembly, including the table, which motive means preferably takes the form of a pinion on the arbor of the indexing table and connected thereto by a one-way clutch, said pinion being rotated by movement of a reciprocal rack bar that is actuated by hydraulic motive means, and the operation of said motive means is controlled by mechanism which is operated through the medium of cam means upon the arbor of the indexing table.

It is another object of the present invention to provide a work holding and indexing apparatus adapted to move a work piece to a plurality of stations in successive order and all of the operations being non-manually controlled so that the apparatus will operate in a wholly automatic manner without requiring manual setting of the control devices, the only manual labor required being to place the work piece on the table at the loading station and remove it therefrom at the unloading station.

Other objects, aims and advantages of the present invention will be apparent to persons skilled in the art after the present improvements are understood from the within description. It is preferred to accomplish the numerous objects of this invention, and to practice the same in substantially the manner hereinafter fully described and as more particularly pointed out in the appended claims, reference being made to the accompanying drawings that form a part of this specification.

In the drawings:

Fig. 1 is a top plan, schematically illustrating the apparatus contemplated herein, and showing the relationship between the indexing table and the means for rolling the edge of the work piece;

Fig. 2 is a vertical elevation partly in section showing the apparatus as viewed along the plane of line 2—2 on Fig. 1;

Fig. 3 is a horizontal section taken along the plane of line 3—3 on Fig. 2 looking in a downward direction;

Fig. 4 is a vertical elevation, partly broken away and viewing the apparatus along the plane of line 4—4 on Fig. 2;

Fig. 5 is a fragmentary section taken along the plane of line 5—5 on Fig. 2 showing the one-way clutch and pinion arrangement for effecting intermittent rotation of the indexing table;

Fig. 6 shows a layout of the electrical circuit for controlling certain mechanical portions of the indexing apparatus; and Fig. 7 is a diagrammatic layout showing the air pressure system for moving the rack piston and the pawl release piston of the present apparatus.

The drawings are to be understood to be more or less of a schematic character and are for the purpose of disclosing a typical or preferred form of present improvements, and in these drawings like reference characters identify the same parts in the different views.

As before stated the present apparatus is particularly adapted for use in rolling the edge of a cultivator disc to impart a beveled, chamfered, or tapered section thereto. To accomplish this function the rolling mill comprises, among other things, opposed rollers A and B, arranged vertically one above the other upon horizontal axes, and one of the rollers has a frustum-conical edge portion C, as seen in Fig. 2. The work piece or disc D is moved from the loading station to the work performing station where the disc edge is entered between the opposed surfaces of the rollers A and B as at the left in Fig. 2. The rolling mill may be of any particular construction and includes power means for driving the rollers to rotate them in opposite directions. Preferably the upper roller A turns counter-clockwise and the lower roller turns clockwise when viewed at the front of the apparatus as at the right-hand side of Fig. 2. The rollers revolve rapidly so that when the work piece reaches the work performing surfaces thereof said piece will be gripped between the meeting surfaces of said rollers and thereby rotated in a horizontal plane to shape the edge of the work piece as required. It is therefore desirable to position the disc-like work piece in proper juxtaposition to the point of contact between the rollers as will later appear herein.

As illustrated in Fig. 2, the dialing mechanism generally comprises a rotatable disc supporting assembly E having an axial arbor 10 which is journaled in antifriction bearings 11 at upper and lower regions of a rectangular housing assembly or superstructure F that is mounted for adjustment on a multiple part base assembly G.

This disc supporting table assembly E has a plurality of radial arm portions 12, the outer ergions of which are enlarged to define bearing bosses 13 in which the rotatable spindles 14 are journaled. These spindles have reduced upper end portions 15 extending above the upper surfaces of the bosses 13 and carry large washers 16 upon which the work pieces, preferably cultivator discs D, are mounted. The work pieces or discs D have central apertures through which the reduced portions 15 of the spindle protrude so that the central region of each disc D rests upon a washer 16, and the remaining portion of the disc extends horizontally toward the rollers A and B of the mill with its peripheral region engaged between these rollers. The central region of the table assembly includes an annular hub defined by a downwardly extending cylindrical flange 17 fitted over the circular head 18 which is attached to and carried by the arbor 10 above the superstructure or housing assembly F. The lower edge of the flange 17 has therein a plurality of notches 19, the number of which correspond with the number of stations to which the supporting table E is to be moved. These notches are adapted to be engaged by a stop bar or latch member 20 pivotally mounted at one end as at 21 in a plate 22 secured to an upper portion of the superstructure assembly F, and the swinging portion of this stop bar is pressed upwardly toward the notched flange 17 of the table by the coiled spring 23 conveniently seated at its lower end in a socket in the top surface of the superstructure. This stop bar 20 points tangentially or obliquely in the direction of rotation of the table E so that it will move out of each notch 19 when the assembly E is arcuately moved to the next station, whereupon the end of the stop bar 20 will enter the next notch 19 and arrest any backward or retrograde movement which is incident to the impact of the stoppage of the work supporting assembly. It will be understood that when the assembly E starts its next arcuate movement, the latch part will be moved out of the notch in which it has been seated and will be ready to enter the next succeeding notch when the table assembly E has moved arcuately to the next station.

The arbor 10 carrying the work supporting table assembly E is intermittently rotated by automatically operated motive means which comprise a pressure cylinder 24 conveniently mounted in the superstructure F and is arranged with its axis horizontal, as best shown in Figs. 2 and 3. The reciprocable piston rod 25 has its end opposite its piston head 26 projected beyond the end of the cylinder 24 where it is connected to a bracket arm 27 depending from the under portion of a horizontally positioned reciprocal rack 28 having a T-shape cross-section. This rack, as shown in Fig. 4, has a longitudinally extending cross member defining flanges 29 vertically above and below the plane of the rack, which flanges are engaged in horizontally positioned guides 30 to permit horizontal sliding movement of said rack. The teeth of the rack mesh with a pinion 31 having a ring-like form (Fig. 5) surrounding and spaced radially from the arbor 10. Keyed to the arbor 10 is an inner race ring 32 having seats or recesses 33 in its margin to receive one-way clutch roller members 34 which are spring urged in the direction of the rotation of the arbor. Thus it is apparent that the inner edge of the annular pinion 31 and the outer edge of said inner race ring 32 define the opposing races of a one-way clutch assembly O. C. In operation, the outward movement of the piston rod 25 causes the rack to drive the annular pinion 31 in a clockwise direction thereby rotating the supporting table assembly E and the one-way clutch permits the rack to be retracted thereby to return the annular pinion 31 to a position for starting a second arcuate movement of the supporting table assembly D when pressure is exerted against the piston head 26. This intermittent movement of the rack and pinion, together with the corresponding movement of the arbor 10, effects an arcuate dialing of the work supporting table assembly to the successive stations and in timed relation to the operation of other portions of the mechanism as later described herein.

Means are provided for intermittently arresting the arcuate movement of the table assembly and its arbor to insure the table being stopped at the proper position at the stations. This intermittent arresting of the table at the stations is accomplished by means of a rachet wheel 35, the teeth 36 of which are preferably arranged to correspond with the number of stations at which the apparatus is to be stopped. A pawl 37 which cooperates with the ratchet teeth is pivotally mounted on a rod 38 and has a pendant lug 39 at its free end to which one end of a link 40 is pivoted, said link being also pivotally connected at its other end to an elongate lever 41 which is fulcrumed at 42 in a bracket on the side of the housing assembly F. The opposite or work end of lever 41 is pivotally connected to a piston rod 43 which has its piston head 44 mounted in a pressure cylinder 45 so that when pressure is exerted back of the head 44 the piston will move the lever 41 in a direction to withdraw the end of the pawl 37 from the ratchet tooth 36 on the wheel 35 with which it had been engaged. The operation of the arrangement last described is also definitely timed with the other mechanisms of the apparatus, as will later be described herein.

It is desirable to provide means for snubbing and cushioning shock which may be imparted to the apparatus, particularly to the table assembly, said snubbing means being operatively timed with respect to the engagement of the arresting lock bar 20 with the table assembly E as hereinbefore mentioned. This snubbing arrangement preferably comprises a generally triangular cam plate 46 of the edge type that is secured to the arbor 10, the three apices of this cam plate corresponding with the three stations at which the dial or disc-supporting table E is arrested by means of the lock bar 20. As shown in Fig. 3, each apex of the cam plate is circumferentially flattened to provide a dwell region 47. Cooperating with the cam plate 46 is an arm 48 pivotally supported at one end on the rod 38 which also fulcrums the pawl 37, and said arm 48 carries a roller 49 on its outer or free end which contacts the edge of the triangular cam 46. The lower or under edge of the arm 48 is arranged so that it will contact the outer end of a plunger 50, the head 51 of which is reciprocable in a cylinder 52, and said head and plunger are normally urged in the direction of arm 48 by a coiled spring 53. The triangular edge cam 46 rotates with arbor 10 until a high point or dwell 47 reaches the roller 49 thus operating the snubber mechanism by depressing plunger 50 as shown in Fig. 3. The roller 49 remains on the dwell 47 while the table is held against rotation during each rolling operation on the disc.

The cylinder 52 of the snubber mechanism contains hydraulic fluid that is acted on by the plunger head 51 when the end of the plunger is retracted into the cylinder by the arm 48 as the result of engagement by the triangular cam plate 46. A fluid conduit 54 leads from the cylinder 52 to the input end of a hydraulic speed control valve assembly 55 wherein fluid flows inward in a restricted quantity, but flows more freely when moving in the reverse direction. The valve disc 55a is urged by the pressure fluid against a seat 55b and the orifice 55c in said disc restricts the flow of fluid in a return direction. When pressure is exerted in the opposite direction the valve disc will rest upon pins 55d thus spacing the valve from the entrance port so that there is a freer flow of the fluid in the reverse direction. The restricted flow of the fluid through the valve orifice 55c continues outward from the control valve assembly 55 through pipe 56 and into a reservoir 57 having therein an outlet at its end opposite the pipe 56 and communicates with an air pipe 59 having a one-way poppet valve 60 therein which closes when pressure forces the fluid to rise in reservoir 57 so that an air chamber 61 is provided above the body of liquid in said reservoir for creating a cushioning effect upon the liquid, as will be readily understood. During the operation of the apparatus, when the dwell 47 on the triangular cam plate 46 has moved away from its position where it depresses the arm 48, piston rod 50 will be released and the fluid will rapidly return through the control valve assembly 55, passing through conduit 54 and back into the cylinder 52 to urge the piston 50 therein in an outward direction, assisted by the spring 53, where it is in position to be engaged by a succeeding apical region of the triangle cam plate 46. This sequence of operation is repeated each time the table is dialed to a next or succeeding station.

During the intermittent operation of the apparatus, the roller 49 on arm 48 remains on a high point or dwell region 47 of cam 46 during the period of time that the work piece or disc is between the rollers of the mill, and the release of the snubber mechanism is timed with the withdrawal of the pawl 37 from a ratchet tooth 36 for permitting arcuate movement of the table to transfer the work piece to the next succeeding station. The intermittent arcuate movements and the periods of rests imparted to the table assembly E are accurately calibrated and are performed in proper sequence by means of an electrical timer mechanism identified generally as T conveniently mounted preferably on the exterior of the frame or housing assembly F, and said timer is activated by means of a limit switch S which has a rocker arm 62 attached to the outer end of a rock spindle 63. The free end of rocker arm 62 carries a roller 64 adapted to be engaged by a horizontal push rod 65 extending through and guided in a wall of housing F, and at its inner end the push rod 65 is coupled by a pin 66 to the free end of a horizontal bell-crank lever 67 that is fulcrumed at its other end on an elongate horizontal bracket 68. Intermediate its ends, or at the angle formed at meeting of its arm, the bell crank 67 carries a roller 69 which engages the edge surface of an annular cam plate 70 having thereon a plurality, preferably three, equally spaced lugs 71 extending away from the annular edge surface and attached to said cam plate by cap screws 71a to permit adjustment of the lugs around the periphery of the plate 70 to properly synchronize the operation of the timer with the mill operation on a disc. This cam plate is keyed or otherwise secured to and rotates with the arbor 10, and said push rod is adapted to urge roller 69 of bell crank 67 against the cam surface by means of a coiled spring 72 surrounding said rod between the housing wall and an abutment collar 73 adjustably secured to said push rod. Thus it is apparent that each time the roller 69 engages a cam lug 71 the bell crank 67 will be rocked on the supporting bracket 68 so that the push rod 65 will be forced outwardly to move rocker arm 62 a proper distance to actuate the limit switch and thus start the timer mechanism for the next cycle of operation. By circumferentially adjusting the lugs 71 the exact moment the limit switch arm 62 is operated is predetermined.

Agricultural discs such as operated on by the present apparatus vary in sizes from a 10" diameter disc to a disc of over 30" diameter, and gauge of the corresponding blanks vary from .095" to approximately .375", these variations depending upon the particular or specific requirements for the types of machines on which the finished discs are to be used. Considering these variations in sizes and gauges it is apparent that an arrangement of the character herein described must have sufficient flexibility of adjustment to take care of runs of discs which may have different dimensions both as to diameter as well as to thickness. The present apparatus is provided with a plurality of means which are adapted to adjust the work support mechanism, including the housing assembly F and the dialing table E, in both vertical and horizontal directions and also towards or from the mill so that the disc being operated on by the rollers A and B will be in the exact position required to bevel or chamfer the edge of each disc during a run of several thousand discs having the same dimensions. By reason of this complete adjustability of the apparatus, the table E may be raised or lowered to position the blank in the horizontal plane defined by the juncture between the rollers, and the table may also be adjusted toward and from the rollers to properly insert only the margin of each disc in an exact position for rolling the desired edge. It will be understood that, after the adjustments have been made for rolling a run of discs of a specified diameter and thickness, the adjusting devices are each locked in this position so that the machine will be "set" to automatically roll any quantity of these particular discs. The apparatus is therefore capable of universal adjustment between certain limits for effecting the rolling of discs of any dimensions between these limits.

The superstructure hereinbefore described rests on and is adjustable with respect to a composite base G which comprises a plurality of superimposed sections which are adjustable with respect to each other for predetermining the exact position of the work piece with reference to the mill. The upper section of base assembly G comprises a horizontal platform 74 with upstanding parallel guides 75 along opposite sides and having inwardly extending flanges 76 which enter channels 77 in the lower portions on the corresponding sides of the housing of the superstructure. This arrangement permits the superstructure to be shifted in a horizontal plane to position the disc in a plane which is perpendicular to the plane defined by the axes of rollers A and B. Adjusting bolts 78 are threaded through upstanding flanges 79 on the platform and at their inner ends these bolts engage the adjacent edge regions of the housing as shown in Figs. 3 and 4. After the desired transverse adjustment has been made by screwing the bolts 78 inward or outward, said bolts are held in place by lock nuts 80. This upper platform section 74 of the base assembly adjusts the table horizontally across the front of the mill to align a disc receiving spindle 15 of the table with the vertical plane of the axis of the rollers.

The flat under surface 81 of the platform 74 rests on the flat upper surface of a second or intermediate section 82 of the composite base assembly G and has longitudinally extending outwardly projecting foot portions 83 to operate in guides 84 of L-section which project upwardly along the adjacent side margins of said intermediate section 82, and as seen in Fig. 2 these guides extend in a direction toward the mill so that the base section 82 may be adjusted to properly position the disc edge between the rollers when the table E is arcuately rotated during operation of the apparatus. The platform section 74 has a bore 85 therein with its outer end region enlarged at 86 to seat an internally threaded nut 87 that is held in place by a lock pin 88. A threaded elongate adjusting bar 89 which is screwed through the nut 87 extends into bore 85 and its outer end is guided in an upstanding lip 90 on the adjacent front portion of a wedge-shaped base section 91. The outer end 92 of the adjusting bar 89 has an angular section to receive a tool for rotating said bar, and lock devices 93 and 94 are threaded on said bar to clamp against opposite sides of the lip 90 in the manner shown in Fig. 2 to hold the bar and the shifted base section in any of its adjusted positions.

The intermediate base section 82 has a generally wedge shape which tapers toward the rolling mill, the taper being defined by the upwardly inclined under surface 95 of said base section. The lower side portions of the base section 82 are reduced in width to provide shoulders 96 and there are longitudinal guide flanges 98 along the corresponding sides of the third or lowermost section 99 of the composite base assembly G as clearly illustrated in Fig. 4. It is, therefore, apparent that the contacting interengaged portions of said base sections 82 and 99 are opposed counterparts, and since the lower section 99 is usually anchored to the floor in front of the rolling mill, any sliding movement of the intermediate section 82 on the lower section will raise or lower the structure above the bottom section 99 thereby to vertically adjust the superstructure with respect to the work performing means and exactly predetermine the position of the work piece or disc D with reference to the rollers A and B. The intermediate section 82 has therein an upwardly arched region 100 in its lower front portion into which a suitably shaped boss 101 projects from the lower front portion of the base section 99. Also, said intermediate section 82 has an elongate bore 102 extending in an upwardly inclined direction from the inner portion of the arched region 100, and seated against a shoulder 103 in this bore is an internally threaded collar 104 that is held in place by a washer 105. An elongate screw 106 is threaded through this collar 104, and has a smooth region 106a within a bore 109 in the boss 101 and is carried in antifriction bearings 107 and 108. A retainer washer 110 holds the bearing 107 in position, and a lock nut 111 screwed on the outer threaded portion 112 of the screw holds the bearing 108 in position. The screw 106 has an angular extension 113 at its projecting end to receive a tool for turning the screw when it is desired to raise or lower the work supporting housing or table for positioning the work piece or disc exactly in line with the contacting or opposed regions of rollers A and B of the mill, it being understood that this adjustment takes place after back-turning the lock nut 111 to release the screw for rotation.

Fig. 7 illustrates, in simplified diagrammatic form, the manner of actuating the reciprocable rack 28 to intermittently and arcuately move the disc carrying table assembly E in synchronized relationship with respect to the intermittent release of the pawl 37 from an abutment 36 on the ratchet plate 35 just prior to the next indexing operation. An air pressure conduit 114 from a suitable supply has branches 115 and 116, the former (115) leading to a first automatically returnable 4-way selector valve 154 preferably of the spool type, and the latter branch (116) leading to a second automatically returnable 4-way selector valve 151 also of the spool type.

Referring to the left-hand portion of Fig. 7, the 4-way selector valve 154 has an exhaust outlet 117 and conduits 118 and 119 leading into cylinder 24 at opposite sides of the piston head 26. A dial turn solenoid 153 has its core connected to the valve body and when the solenoid is energized the valve body is moved to the right for delivering air pressure through conduit 118 to the cylinder 24 back of the piston head 26 thereby forcing the piston rod 25 and the rack 28 to the right to arcuately move the arbor 10 and table assembly clockwise to a succeeding station. During this travel of piston head 26 to the right, air is bled through conduit 119, valve 154, and is discharged through the exhaust 117. When the solenoid 153 has been deenergized a spring 120 returns the valve body to the left to its normal position so that air pressure will pass out of valve 154, through conduit 119, and enters cylinder 24 in front of the piston head 26 thus to retract the piston 26 and rack 28 without rotating the arbor 10 due to the overrunning of the one-way clutch assembly O. C. The air pressure exerted against the back of piston head 26 is sufficiently high to withdraw the disc D from between the rollers A and B when the edging cycle is completed and the table is indexed to move the disc to the delivery station.

Considering the structure at the right side of Fig. 7, the 4-way selector valve 151 has an exhaust outlet 121 and conduits 122 and 123 lead into cylinder 45 at opposite sides of the piston head 44. A pawl release solenoid 150 has its core connected to the valve body and when this solenoid becomes energized the valve body is moved to the right for delivering air pressure through conduit 122 back of the piston head 44 thereby forcing rod 43 outward to depress lever 41 which in turn pulls down the pawl 37 a distance to disengage said pawl from the ratchet abutment 36 to permit the table to be dialed to the next station by the piston 26 and rack 28. During outward movement of piston rod 43 air on the other side of the head 44 is withdrawn from the cylinder 45, through conduit 123, valve 151, and is discharged through the exhaust 121. When the solenoid 150 has been deenergized a spring 124 returns the valve body to its normal position or to the left so that air pressure passes out of valve 151 through conduit 123 and enters cylinder 45 in front of the head 44 thereby retracting the piston rod 43 to permit the pawl to ride the edge of cam 35 until engaged with the next abutment which arrests the table at the succeeding station.

The electrical system employed in the herein described apparatus will now be described in connection with layout diagram shown in Fig. 6. The operation of this electrical circuit and its connected electrical elements is for the purpose of electrically controlling the dial feed mechanism in connection with which reference also is made to the diagram illustrated in Fig. 7.

In the circuit diagram shown, the pawl release solenoid 150 controls the valve 151 (Fig. 7) which is the 4-way selector valve controlling the supply of air to the pawl release cylinder 45, and the dial turn solenoid 153 is the solenoid for controlling the 4-way selector valve 154 which controls the supply of air to the cylinder 24. Both of the valves 151 and 154 are automatically or spring returned so that upon deenergization of the respective solenoids the valves are automatically moved to their initial positions.

A pair of stop buttons 156 and 157 are provided for safety purposes, and a pair of start buttons 158 and 159 are provided for initiating operation of the mechanism. The start button 158 controls the relay 160 and the start button 159 controls the relay 161.

The relay 160 controls three normally open switches 162, 163 and 164 while the relay 161 controls two normally open switches 165 and 166 and a normally closed switch 169. The operator initially closes the start button 158 and this momentarily completes a circuit from line L2 through the relay 160, through the stop button 156, through the start button 158 to line L1. Relay 160 is thereupon energized so that switches 162, 163, and 164 are closed. Closure of switch 162 completes a locking circuit for the relay 160 which extends from line L2, through the relay 160, through the stop button 156, and through the closed switch 162 to the line L1. Closure of the switch 163 extends line L1 from this switch to the upper terminal of switch 166. Closure of the switch 164 extends line L2 to the upper terminal of switch 165.

In order to effect operation of the indexing mechanism the operator then closes the start button 159 and this completes a momentary energizing circuit for relay 161. This circuit extends from line L1, through the now closed switch 163, through the relay 161, through the stop button 157, and through the start button 159 to the upper terminal of switch 165 which has line L2 extended thereto from the now closed switch 164. The momentary energization of relay 161 causes it to close its two associated switches 165 and 166 and open its associated switch 169. The closure of switch 165 completes a holding circuit for the relay 161 which extends from the upper terminal of switch 166 having line L1 extended thereto, through the relay 161, through the stop button 157, and through the switch 165 to line L2 extended thereto through the now closed switch 164. Closure of the switch 166 extends line L1 to a terminal 167 in the timer mechanism 168.

During the rotation of the indexing mechanism the control cam 70 having edge lugs 71 thereon momentarily closes the limit switch S at a point in the indexing cycle between one-half and two-thirds of the distance from the last stop position of the table. Closure of the limit switch S causes a circuit to be completed from line L2, through the limit switch S, through a relay 170 to the terminal 167 having line L1 extended thereto. Closure of the limit switch S is momentary; however, it is of sufficient duration to cause the relay 170 to close a switch 171 and also to close a switch 172. Closure of the switch 171 completes a circuit for operating the timer motor 173 and this circuit extends from line L1 at terminal 167, through the timer motor 173 to a terminal 174, and through the closed switch 171 to line L2 extended thereto. Both of the switches 171 and 172 are of the type which, upon being closed by the relay 170, remain closed until opened by other means and after a predetermined interval of time (three or four seconds) the timer motor 173 causes the switches 171 and 172 to move to their open positions.

The switch 172 controls the operation of a relay 175, and this relay operates the normally closed switch which is in series with the dial turn solenoid 153 and the normally closed switch 177 which is in series with the pawl release solenoid 150. While the switch 172 is closed the relay 175 is energized and this causes the two switches 176 and 177 to open. This in turn causes the two solenoids 150 and 153 to be deenergized so that the springs 124 and 120 on the other ends of the 4-way selector valves 151 and 154 respectively move said valves to positions to operate the respective piston heads 44 and 26 to cause the lock pin or pawl 37 to engage the cam 35 and thence the tooth 36 and return the piston head 26 and rack 28 to the left preparatory to the next advance of the rack 28 to the right.

When the timer 168 subsequently opens the switches 171 and 172 the timer is stopped and the relay 175 is deenergized. This permits the switches 176 and 177, to close, again energizing the solenoids 150 and 153.

To begin the operation of the work holding and indexing apparatus and to effect a continuous operation thereof the operator depresses the start button 158 to energize the solenoid 160, which is held energized, as hereinbefore explained, and allows line L1 to be brought to the upper terminals of the switch 166 and line L2 to be brought to the upper terminals of switches 165 and 169. It may be noted that switch 169, being normally closed, energizes relay 175 to open the two normally closed switches 176 and 177 associated therewith which disconnects the solenoids 150 and 153. At this time the valves 151 and 154 occupy the positions shown in Fig. 7, which cause air pressure to be applied to the piston heads 44 and 26 to respectively position them in their upper and left hand positions so that the rack 28 and pawl 36 occupy the positions shown in Fig. 3.

To start automatic operation of the indexing mechanism the operator depresses the button 159 to energize the relay 161 and upon energization of this relay the switches 165 and 166 are closed while the switch 169 is opened. The opening of this latter switch 169 deenergizes the relay 175, thereby allowing its associated switches 176 and 177 to close to in turn energize the solenoids 150 and 153. This begins the cycle for starting the arcuate movement of the work supporting assembly E by moving the pawl 37 out of braking position and the rack 28 to the right as viewed in Fig. 3. After the work supporting assembly E has advanced approximately one-half to two-thirds of the distance to be travelled, the cam 71 causes the limit switch S to be momentarily closed. The momentary closure of the limit switch S actuates the relay 170 of the timer 168 as explained hereinbefore. The actuation of the relay 170 closes switches 171 and 172 which complete the circuit to cause the timer to continue to operate and to energize the relay 175. The energization of the relay 175 causes its switches 176 and 177 to open as previously described, and this in turn causes deenergization of the solenoids 150 and 153 to permit the two valves 151 and 154 to control the supply of air for moving the pawl 37 into its braking position and the rack 28 into its original position, the one-way clutch O. C. permitting retrograde movement of the pinion 31 at this time. The momentum of the work supporting assembly E, the shaft 10 and the cams carried thereby, causes the same to continue rotating until the pawl 37 strikes the stop 36 on the cam 35, the snubbing mechanism functioning at this time to aid in stopping rotation of the work supporting assembly E.

After a predetermined interval of time, of the order of three to four seconds, the timer motor 173 opens the switches 171 and 172, thereby stopping further operation of the timer and deenergizing the circuit to the relay 175. The deenergization of the relay 175 causes the switches 176 and 177 to again close so as to restore the energizing circuit for the solenoids 150 and 153. This subsequent energization of the solenoids causes them to move each of their associated valves to the right thereby causing the pawl 37 to be withdrawn from the stop 36, and the rack 28 to be moved from the position shown in Fig. 3 to the right to advance the work supporting assembly to its next position.

It will be apparent that when the operation of the work holding and indexing apparatus is initiated it automatically continues to function through the cooperation of the timer mechanism until stopped by the operator's depressing one of the stop buttons.

While this invention has been described in detail in its present preferred form or embodiment, it will be apparent to persons skilled in the art, after understanding the improvements contemplated herein, that various changes or modifications may be made therein without departing from the spirit or scope thereof. It is aimed in the appended claims to cover all such changes and modifications.

What is claimed is:

1. In a work holding and indexing apparatus, a base, and a superstructure mounted thereon; rotatable means on said superstructure for supporting a work piece for intermittent arcuate movement to and from a plurality of stations including a station having work performing means thereat; motive means for intermittently driving said work supporting means between said stations; devices for arresting and locking said work supporting means against movement at each station; first adjusting means movable in a horizontal plane beneath said superstructure for bodily shifting said superstructure horizontally towards and from the above-mentioned work performing means; and second adjusting means interposed between and acting directly upon said base and first supporting means and movable in an inclined plane for raising and lowering said superstructure relative to the horizontal plane of the work performing means.

2. In a work holding and indexing apparatus as defined in claim 1, wherein the base has an inclined upper surface, and the second adjusting means is of wedge-shape and operates on said inclined surface of the base.

3. A supporting and indexing apparatus for automatically feeding discs to a rolling mill, comprising a horizontally rotatable carrier for supporting a disc for arcuate movement in a generally horizontal plane successively from a loading station to a work performing station at the mill and thence to an unloading station; motive means intermittently driving said carrier to said stations in the order named; arresting means holding said carrier against movement at each station; a platform section on which said carrier is mounted for horizontal adjustment transversely in front of the mill; an intermediate section on which said platform is adjustably movable in a horizontal plane toward and from the work station and having an inclined lower surface; and a fixed base beneath and supporting said intermediate section, said base having an inclined upper surface with which the inclined surface of said intermediate section is slidably engaged for vertically adjusting said carrier with respect to the horizontal plane of the work performing members of the rolling mill.

4. An apparatus as defined in claim 3 including manually operable devices for adjusting the platform and the intermediate section each independently of the other and also independently of the base.

5. A supporting and indexing apparatus for automatically feeding discs to a rolling mill, comprising a horizontally rotatable carrier assembly for supporting a disc for arcuate movement in a generally horizontal plane successively from a loading station to a work performing station at the mill and thence to an unloading station; motive means for intermittently driving said carrier to said stations in the order named; arresting means holding said carrier against movement at each station; a horizontal platform on which said carrier assembly is slidably mounted for horizontal adjustment transversely in front of the mill; means for effecting said adjustment of the carrier; an intermediate section on which said platform is slidably mounted; adjusting means connecting said intermediate section and platform for moving said platform in a horizontal plane toward and from the work station; said intermediate section having an inclined lower surface; a fixed base beneath and supporting said intermediate section, and having an inclined upper surface adjoining the inclined surface of said intermediate section; and means operatively connecting said base and intermediate section for adjustably moving the former on the latter transverse to the axis of the carrier assembly and thereby vertically move the carrier assembly to selectively position said assembly in horizontal alinement with the work performing members of the mill.

6. A supporting and indexing apparatus for positioning discs with respect to a rolling mill, comprising a horizontally rotatable table for supporting a disc for arcuate movement in a generally horizontal plane to and from a work performing station at the mill; a superstructure rotatably supporting said table for rotatable movement; a platform supporting said superstructure for horizontal adjustment transversely across the front of the mill; a wedge-shaped fixed base spaced beneath said platform; a wedge-shaped intermediate section between said base and platform section and on which said platform is horizontally adjustable toward and from the mill; and means for moving said intermediate section with respect to said base, thereby to vertically adjust said platform, superstructure and table with respect to the mill.

7. A supporting and indexing apparatus for positioning discs with respect to a rolling mill, comprising a horizontally rotatable table for supporting a disc for arcuate movement in a generally horizontal plane to and from a work performing station at the mill; a superstructure supporting said table for rotatable movement; a platform supporting said superstructure for horizontal adjustment transversely across the front of the mill; and a composite base assembly supporting said platform and superstructure, said assembly comprising a pair of horizontally positioned sections having oblique adjoining faces, one of such sections being fixed and the other section being slidably adjustable thereon for adjustably elevating and lowering said platform and elements supported thereby with respect to the work performing members of the mill.

8. In an apparatus of the kind described an adjustable basal assembly comprising two superposed wedge-shaped bodies having oblique proximate surfaces, the lower body being fixed and the upper body being adjustably slidable thereon to position said upper body in predetermined vertical planes; a third body adjustably slidable horizontally on said upper body in directions toward and from a work performing device; separately operable means for independently effecting the aforesaid adjustments of said upper and third bodies; and an indexing assembly supported by said basal assembly and comprising a platform adjustably slidable on said third body in a horizontal plane at an angle to the plane of movement of said third body; a horizontal intermittently rotatable table for supporting a work piece for movement to and from the work performing device; and means carried by said platform for imparting intermittent rotative movement to said table.

9. In an apparatus for feeding discs to a rolling mill comprising a horizontally positioned intermittently rotatable table; indexing means for supporting said table for intermittent rotation; and an adjustable supporting assembly for said table and indexing means comprising two superposed wedge-shaped bodies, the lower body being fixed and the upper body being adjustably slidable thereon; adjusting means coacting with said bodies to move said upper body in a vertical direction; a third body adjustably slidable horizontally on said upper body in directions toward and from a work performing device; adjusting means coacting with said upper and third bodies for moving said third body in a horizontal plane toward and away from the mill; and a platform beneath and carrying said indexing means and table and being adjustably slidable on said third body in a horizontal plane at an angle to the plane of movement of said third body.

References Cited in the file of this patent

UNITED STATES PATENTS

| Number | Name | Date |
|---|---|---|
| 728,379 | Ditson | May 19, 1903 |
| 856,662 | Smith | June 11, 1907 |
| 921,983 | Hanson | May 18, 1909 |
| 1,533,165 | Cross | Apr. 14, 1925 |
| 1,578,232 | Ferris | Mar. 23, 1926 |
| 1,708,569 | Fotheringham | Apr. 9, 1929 |
| 1,745,460 | Sudhoff | Feb. 4, 1930 |
| 1,912,166 | Skow | May 30, 1933 |
| 1,973,329 | Bullows | Sept. 11, 1934 |
| 1,975,008 | Kingsbury | Sept. 25, 1934 |
| 1,985,477 | Wolf | Dec. 25, 1934 |
| 1,989,517 | Holmes | Jan. 29, 1935 |
| 2,032,011 | Gould | Feb. 25, 1936 |
| 2,187,544 | Laessker | Jan. 16, 1940 |
| 2,262,103 | Laessker | Nov. 11, 1941 |
| 2,396,495 | Drake | Mar. 12, 1946 |
| 2,517,193 | Fraser | Aug. 1, 1950 |
| 2,527,804 | Flygare et al. | Oct. 31, 1950 |
| 2,622,487 | Schultz | Dec. 23, 1952 |